Aug. 5, 1930.   H. H. WILLIAMS   1,772,273
METHOD OF MAKING WHEELS
Original Filed Nov. 11, 1924   2 Sheets-Sheet 1
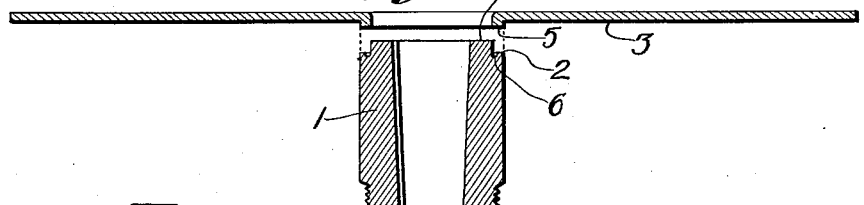
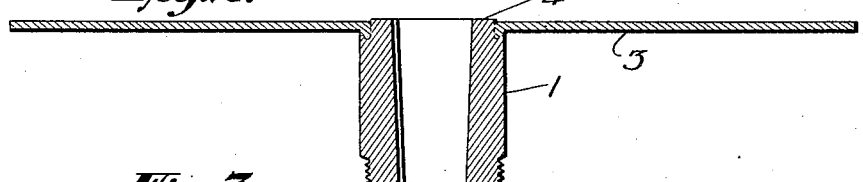
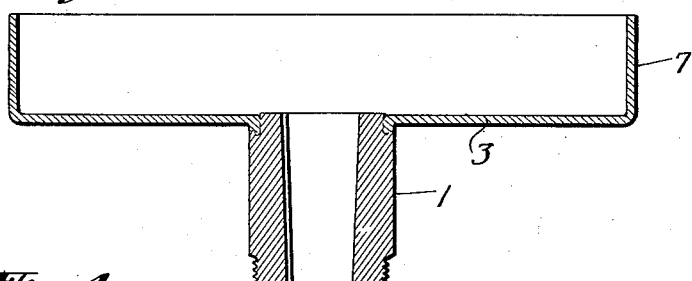
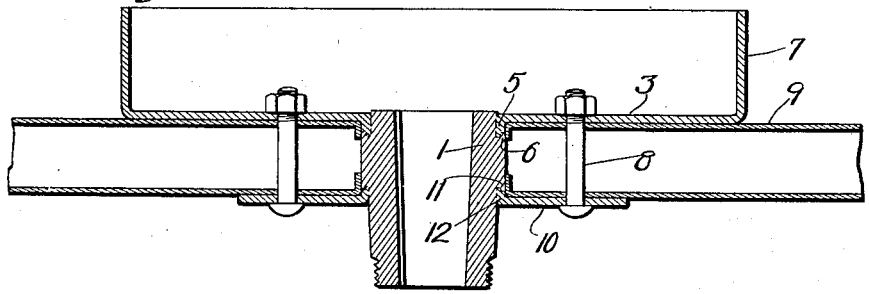
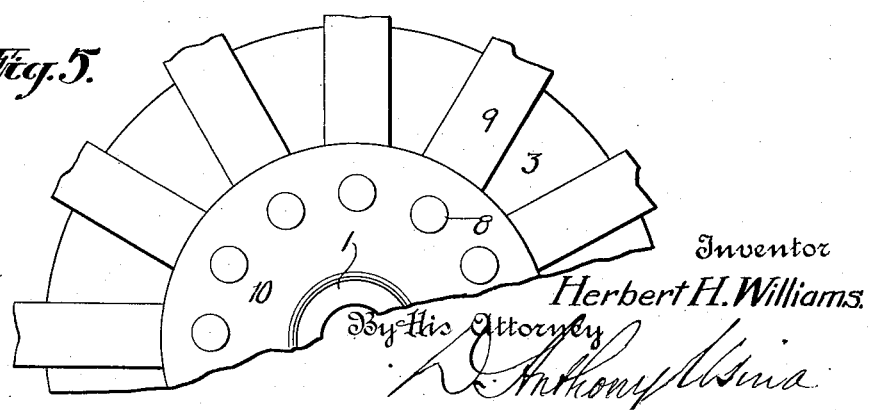
Inventor
Herbert H. Williams
By His Attorney

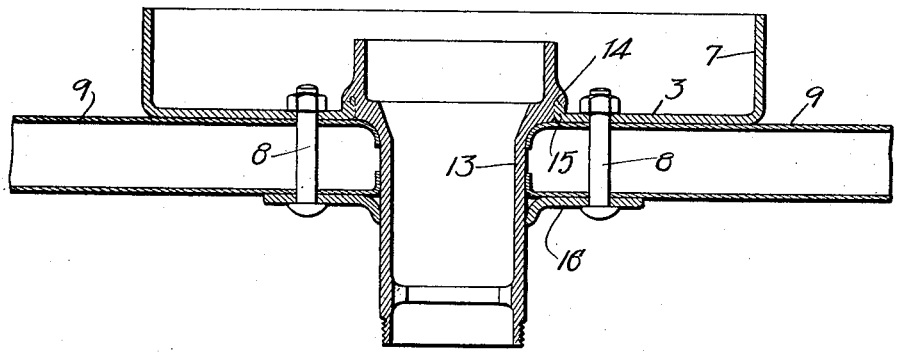

Patented Aug. 5, 1930

1,772,273

UNITED STATES PATENT OFFICE

HERBERT H. WILLIAMS, OF BROOKLYN, NEW YORK, ASSIGNOR TO THOMAS E. MURRAY, OF BROOKLYN, NEW YORK; JOSEPH BRADLEY MURRAY, THOMAS E. MURRAY, JR., AND JOHN F. MURRAY, EXECUTORS OF SAID THOMAS E. MURRAY, DECEASED, ASSIGNORS TO METROPOLITAN ENGINEERING COMPANY, A CORPORATION OF NEW YORK

METHOD OF MAKING WHEELS

Application filed November 11, 1924, Serial No. 749,113. Renewed July 6, 1929.

My invention aims to provide an improved method of construction for vehicle wheels and particularly for automobile wheels, in which the accurate centering of certain parts is facilitated. In the specific embodiment of the invention herein described the hub of the wheel and a brake drum are combined in practically one structure and the drum is accurately formed about the center of the hub. The accompanying drawings illustrate embodiments of the invention.

Figs. 1, 2, 3 and 4 are diametric sections illustrating the successive steps in producing a wheel;

Fig. 5 is a side elevation of the center of the wheel.

Fig. 6 is a diametric section illustrating a modification.

Referring to the drawings, a wheel hub 1 is machined to the desired dimensions, with an exactly centered hole for the axle and with a shoulder 2 on the inner end against which the brake drum is to be welded. Such a hub may be cut out of bar stock on a screw machine and thus produced at a minimum cost; or it may be of forged or cast metal if the design requires it.

A flat disc 3 of the required thickness is provided with a central opening fitting over the end 4 of the hub and surrounded by a flange 5 which registers with the shoulder on the hub. The hub and disc are then welded together preferably by the Murray method of welding in which the parts are pressed together while a current of very high amperage or density is passed across the joint for a very brief interval of time, generally a fraction of a second. Preferably, the shoulder 2 is undercut as at 6 (Fig. 1) so that when the parts are pressed together and the welding current is passed, the flange 5 and the shoulder or bead 2 will be interlocked in the fashion indicated by dotted lines in Fig. 2.

The third step consists in bending up the outer edge of the disc 3 to form the brake drum 7. The hub and disc are placed together in a die, the machined portion of the hub acting to center the disc accurately with respect to the axis of the hub so that in drawing the flange 7 it will be held true and concentric with the axis of rotation of the wheel when the axle is mounted in the hole in the hub. This is an important point because the drum against which the brake is applied must run true to the axis of the hub bearings. It is not practical to weld a completed brake drum to the hub and maintain the accurate centering of the drum required; but by the improved method described the drum is formed accurately centered. Also a combined hub and brake drum is made possible with a low cost and of a comparatively light weight.

The brake drum welded to the hub in this way, or rather the disc 3 of said drum, has the additional advantage of serving as a flange against which the spokes and the retaining plate are readily assembled and fastened in place, thus avoiding the usual provision of a special flange on the hub for this purpose.

It is often desirable to provide a driving connection from the hub to two flanges one on each side of the spokes, particularly in the case of the rear or driving wheels of motor cars. A suitable arrangement for this purpose is shown in Fig. 4 which shows a disc 3 of the brake drum provided with holes at required locations and bolts 8 or rivets passing through the disc, through spokes 9 and plate 10. In this case also the hub has been turned to provide shoulders 11 for engagement by a flange 12 on the inner edge of the retaining plate or ring 10; the flange 12 and shoulder 11 being welded together for greater security. Thus the driving force will be transmitted directly from the hub through the disc 3 and the ring 10 to the spokes. The welding at 11, 12 may be done after the parts are assembled in place; the brake drum, spokes and retaining flange being then riveted or bolted together as shown.

For cars having brakes on steering wheels, usually the front wheels, a similar combination hub and brake drum may be provided. The hub, however, will generally be of different design. See Fig. 6. The hub 13 is of pressed or forged steel or cast metal suitable for welding, and, preferably, of two forged half hubs welded together, after which the hub is machined to the desired design so as to form a shoulder or bead 14 for application to the brake drum. The disc portion 3 of the drum has a central opening fitting over the hub and surrounded by a flange 15, and the latter is welded to the shoulder or bead 14, after which the edge of the disc is drawn up to form the drum 7. In Fig. 6 a retaining ring 16 is illustrated fastened by bolts 8 which also hold the spokes 9; the retaining ring 16, however, not being welded to the hub. It will be understood that a similar arrangement may be applied to the hub of Figs. 1, 2 and 3, and that the welded retaining ring 12 may be applied to the construction shown in Fig. 6. It is to be understood also that the shoulder on the hub may face inward as in Fig. 1 or outward as in Fig. 6, for either kind of wheel; the flange 5 or 15 on the disc of the brake drum being extended accordingly outward or inward.

In some instances, in order to secure greater accuracy in certain dimensions, it will be desirable to omit some or all of the machining operations until after the welding and drum-forming operations are completed. The invention may be applied either in the production of a combined hub and brake drum as a complete article of manufacture or in the production of the entire wheel including such articles.

The invention is applicable also to other parts of a wheel than brake drums. By uniting parts of the structure into a unit including a central portion, the surrounding portion or portions may be afterwards stamped, bent or similarly shaped under center control so that the finished structure will be symmetrically or accurately shaped with reference to the fixed axis.

The inner edges of the discs that are to be welded to the hub make a free fit over the reduced portions of the hub. This is essential to facilitate the welding operation. Any slight sidewise shifting of the brake disc which may result from such a loose fit is, however, of no importance since the flange is bent up after the welding and is truly concentric about the axis.

Though I have described with great particularity of detail certain embodiments of my invention, yet it is not to be understood therefrom that the invention is restricted to the particular embodiments disclosed. Various modifications may be made by those skilled in the art without departure from the invention as defined in the following claims.

What I claim is:

1. In the production of vehicle wheels the method which consists in forming a hub with an annular shoulder in a plane transverse to the axis, welding a disc thereto by axial pressure against said shoulder, re-shaping the outer portion of the disc to form a brake drum concentric with the axis and applying the spokes or equivalent parts around the hub and fastening them to the disc.

2. In the production of vehicle wheels the method which consists in forming a hub with annular shoulders in planes transverse to the axis, welding thereto by axial pressure a brake disc and a retaining flange, re-shaping the outer portion of the disc to form a brake drum concentric with the axis and applying the spokes or equivalent parts around the hub and joining them to the disc and flange.

3. In the production of vehicle wheels the method which consists in forming a hub with a hole through its centre and with an annular shoulder in a plane transverse to the axis, welding a disc thereto by axial pressure against said shoulder and re-shaping the outer portion of the disc concentric with the hole previously formed in the hub.

4. In the production of vehicle wheels, the method which consists in forming a hub and a sheet metal disc with joint faces, welding the disc to the hub along such faces and drawing the outer portion of the disc concentric with the axis of the hub to form a drum flange at one side of the disc.

5. In the production of vehicle wheels the method which consists in forming a hub, forming a sheet metal disc with a central opening to receive a portion of the hub, inserting such portion of the hub loosely into the disc, uniting the disc to the hub in this position and drawing the outer portion of the disc concentric with the axis of the hub to form a drum flange at one side of the disc.

6. In the production of vehicle wheels the method which consists in forming a hub, uniting a sheet metal disc thereto in approximately centered position and drawing the outer portion of the disc accurately concentric with the axis of the hub to form a drum flange at one side of the disc.

7. In the production of vehicle wheels with brake drums, the method which consists in forming a hub, uniting a sheet metal disc to said hub in approximately centered position, drawing the outer portion of the disc accurately concentric with the axis of the hub to form a drum flange extending toward the plane of an end of the hub and applying the spokes or equivalent parts around the hub at the side of the disc which is opposite to the edge of the drum flange.

8. In the production of vehicle wheels with brake drums, the method which consists in forming a hub, uniting a sheet metal disc to said hub in approximately centered position, drawing the outer portion of the disc accurately concentric with the axis of the hub to form a drum flange extending beyond an end of the hub and applying the spokes or equivalent parts around the hub and against the face of the disc which is opposite to the edge of the drum flange and fastening them to the disc.

In witness whereof, I have hereunto signed my name.

HERBERT H. WILLIAMS.